United States Patent [19]
Naka et al.

[11] Patent Number: 5,162,612
[45] Date of Patent: Nov. 10, 1992

[54] CLOSURE PLATE FOR COVERING OPENING OF FLOOR PANELS

[75] Inventors: Hiromasa Naka; Takehiko Okushima; Takao Okumura; Tatsuo Shoji; Tetsuo Tobikawa; Norio Nakamura, all of Tokyo, Japan

[73] Assignee: Naka Corporation, Tokyo, Japan

[21] Appl. No.: 528,192

[22] Filed: May 24, 1990

[30] Foreign Application Priority Data

Jun. 6, 1989 [JP] Japan .................................. 1-142158

[51] Int. Cl.$^5$ .......................... H02G 3/00; H02G 3/14
[52] U.S. Cl. .................................. 174/48; 174/65 R; 174/66; 174/67; 220/3.8
[58] Field of Search ...................... 174/48, 65 R, 65 G, 174/66, 153 R, 153 G, 49, 50, 67; 52/126.2, 126.5, 127.7, 220, 221, 263, 360, 357; 220/3.8, 307

[56] References Cited

U.S. PATENT DOCUMENTS

| 4,237,666 | 12/1980 | Kohaut | 52/221 |
| 4,638,115 | 1/1987 | Benscoter | 174/48 |

FOREIGN PATENT DOCUMENTS

| 7231748 | 11/1972 | Fed. Rep. of Germany . | |
| 0280167 | 11/1989 | Japan | 174/48 |

Primary Examiner—Leo P. Picard
Assistant Examiner—Hyung S. Sough
Attorney, Agent, or Firm—Wenderoth, Lind & Ponack

[57] ABSTRACT

A closure plate for detachable attachment to the opening formed in a floor panel is provided. The closure plate includes a flexible, integral locking pawl provided with a protrusion at a desired position thereof. The resiliently deformable locking pawl can be formed integrally with the closure plate, and can have an enlarged portion at the free end of the pawl, and the plate can have a manipulation bore with a recessed surface in the inner periphery thereof for receiving the free end of the pawl. The closure plate includes at least in the upper surface thereof a guide portion defining a wiring port.

6 Claims, 6 Drawing Sheets

CLOSURE PLATE FOR COVERING OPENING OF FLOOR PANELS

FIELD OF THE INVENTION

This invention relates to a closure plate adapted to be removably secured to an opening formed in a floor panel.

BACKGROUND OF THE INVENTION

A double floored construction, i.e., free access floor, has been known. This construction comprises a plurality of floor panels extending above a base floor, such as a concrete floor, so as to establish free space between the base floor and the floor panels for allowing wiring of cables.

With such free access floor, an opening is formed in the floor panel for enabling power cables for an electronic apparatus such as terminal equipment, telephone and/or signal cables to be drawn onto the floor panel surface from the free space below the floor panel or to be drawn into the free space from the surface of the floor panel. The opening is covered by a closure plate mounted thereon. In this connection, reference should be made to Japanese Utility Model Public Disclosure (KOKAI) No. 62-165331.

A prior art closure plate such as shown above is constructed so as to be simply mounted in the opening of the floor panel without any specific interengagement means therebetween and hence is disadvantageous in that the closure plate tends to become loosened and disengaged from the opening when vibration or shock is given to the floor panel or when the cable inserted in the opening is displaced.

It is also necessary for the prior art floor panel that the openings thereof through which no source cable nor signal cable is inserted be covered by a closure plate, while the openings thereof through which source cable or signal cable is inserted be covered by a closure plate having a wiring port formed therein. Accordingly and when an increase in the equipment or modification of the layout, it is required is essential in the prior art floor panel to replace the closure plate previously mounted in the opening with another closure plate of a different type or to form a port in the closure plate by drilling, for example, for suitable application, thus making working the operation very complicated or time-consuming.

Furthermore, the above described prior art floor panel is designed so as to be simply mounted in the opening of the floor panel with the upper surface thereof being flush with the upper surface of the peripheral edge of the opening. It is therefore disadvantageous in that, when an operator intended wants to remove the closure plate from the opening after the completion of installation so as to, for example, draw cables into the free space between the floor panel and base floor, he must have tools, such as screw drivers, in order to wrench the closure plate open with the tip of the driver engaged with the periphery of the closure plate or with the tip of the driver inserted into a hole formed in the closure plate for that purpose.

It is a general object of the invention to provide a closure plate for covering the opening of a floor panel which is capable of being mounted in and removed from the opening of the floor panel with one-touch operation and which is, during attachment to the opening, adapted to be firmly secured to the opening without any looseness therebetween.

It is another object of the invention to provide a closure plate for covering the opening of a floor panel which facilitates increase of equipment and/or modification of the layout of the equipment.

It is further object of the invention to provide a closure plate for covering the opening of a floor panel which can be attached to the opening of a floor panel with one-touch operation without the need of any fixing members, such as screws, and which, in its installed condition, can be easily removed from the opening of a floor panel by hand without the aid of any tools, such as screw drivers.

SUMMARY OF THE INVENTION

According to one aspect of the invention, a closure plate for detachable attachment to the opening formed in a floor panel comprises a flexible, integral locking pawl formed with a protrusion at a desired position thereof.

According to another aspect of the invention, a closure plate for detachable attachment to the opening formed in a floor panel comprises at least in the upper or lower surface thereof a guide portion defining a wiring port.

According to still another aspect of the invention, a closure plate for detachable attachment to the opening formed in a floor panel comprises an elastically deformable locking pawl formed integrally with the closure plate, an enlarged portion at the free end of the pawl and a manipulation bore with a recessed surface in its inner periphery thereof for receiving the free end of the pawl.

In accordance with the closure plate of the invention, the locking pawl is resiliently deformed upon attachment in the opening of a floor panel and thus causing reactive force which acts on a flange of the opening of the floor panel so as to retain the closure plate therein in a press-fit manner. Accordingly, any looseness between the opening and the closure plate can be obviated. Further, the enlarged portion formed in the pawl latches onto the flange of the opening; whereby dislodgement of the closure plate from the opening is prevented.

In accordance with the closure plate of the invention, a wiring port can be easily formed by removing the portion of the closure plate surrounded by the guide portion. An opening which is intended to have a cable inserted there through will be covered with a closure plate with its wiring port open. Alternatively, an opening which is not intended to have a extending cable there through will be covered with a closure plate with its wiring port closed.

In accordance with the closure plate of the invention, the enlarged portion on the free end of the pawl positioned in the manipulation bore is accessible by a finger so as to release press-fit engagement force of the pawl against the flange portion of the opening, whereby the closure plate can be easily removed from the opening, thus allowing easy wiring work even after the completion of the installation.

BRIEF DESCRIPTION OF THE DRAWINGS

For a better understanding of the present invention together with other and further objects, advantages and capabilities thereof, reference is made to the accompanying drawings which are incorporated herein by reference and in which like reference characters refer to like parts of the invention and in which.

Figure 1:
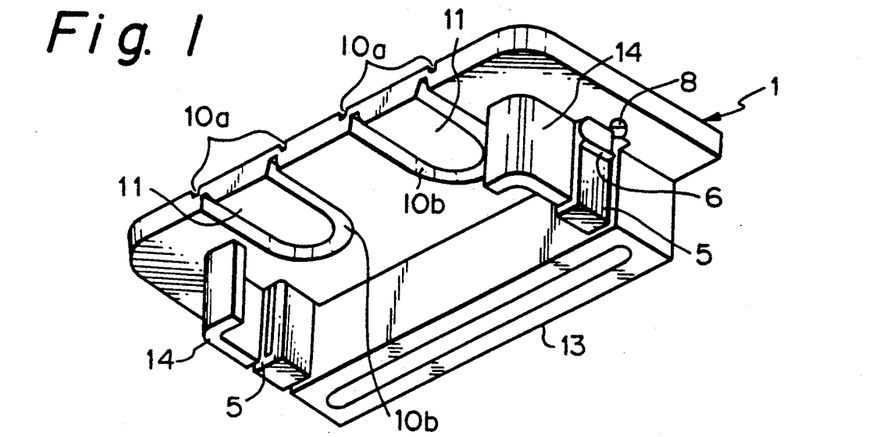
FIG. 1 is a perspective view of a closure plate of the invention as viewed from the underside thereof.
Figure 2:
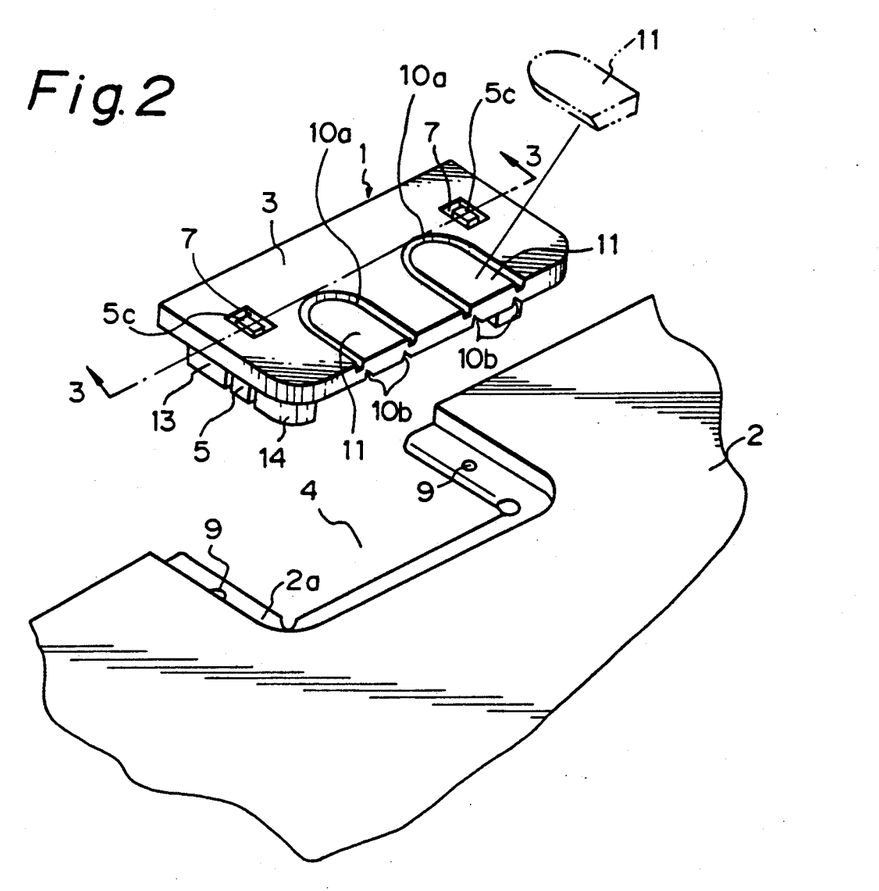
FIG. 2 is a perspective view of a closure plate of the invention as viewed from the upper side thereof, showing the position before attachment thereof to the opening of the floor panel.

DETAILED DESCRIPTION OF THE PREFERRED EMBODIMENTS:

FIG. 1 is a perspective bottom view of a closure plate 1 for covering the opening of a floor panel according to one embodiment of the invention, and FIG. 2 is a perspective top view of the closure plate 1 and the opening 4 of a floor panel 2 to which the closure plate is to be attached.

Figure 3:
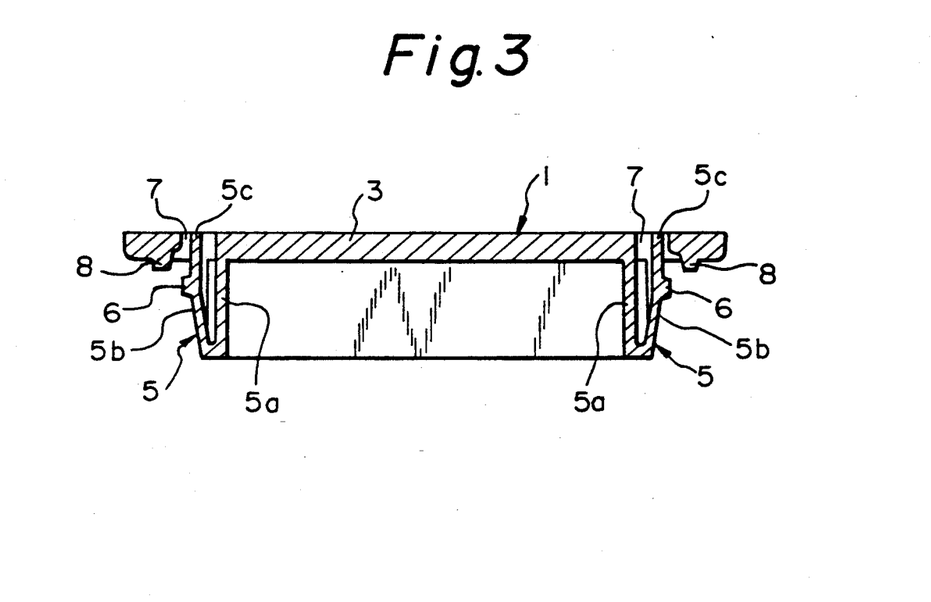
FIG. 3 is a cross-sectional view along line 3—3 in FIG. 1.
Figure 4:
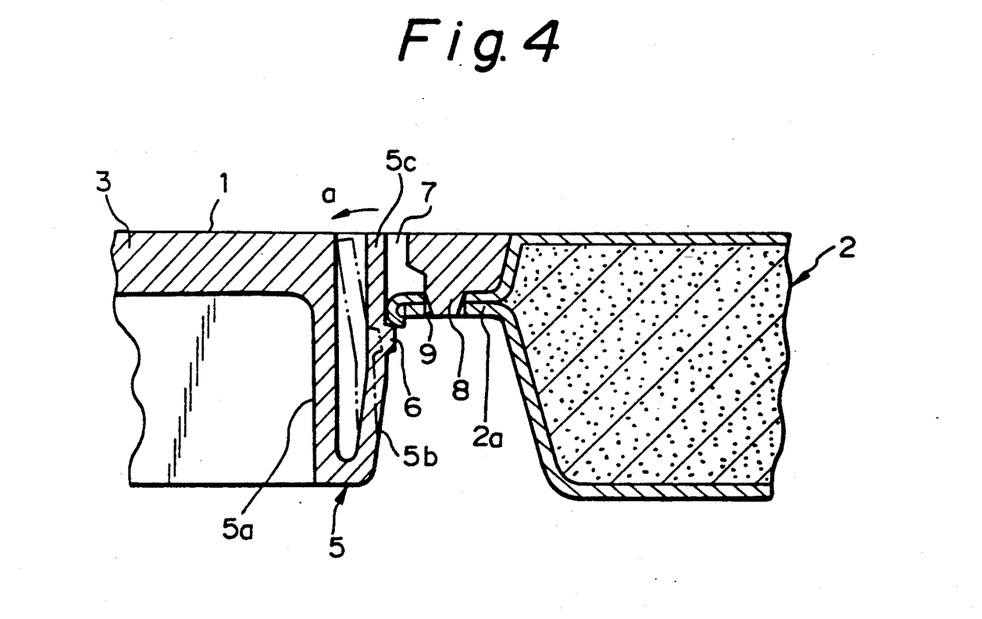
FIG. 4 is a cross-sectional view illustrating the closure plate of FIG. 1 being attached to the floor panel.

The closure plate 1 comprises a plate member 3 constituting in its installed position a part of the surface of the floor panel 2 and a flexible locking pawl 5 adapted to engage with a flange portion 2a extending around the inner periphery of the opening 4 of the floor panel 2. The pawl 5 has a U-shaped configuration with the upper end thereof open. That is to say, one leg 5a of the pawl 5 extends integrally from the plate member 3 in the downward direction and is bent into a U-shaped configuration at its lower end, while the other leg 5b extends upwardly from the bent lower end to terminate at its upper free end 5c, as shown in FIGS. 3 and 4. The leg 5b has at a desired position a protrusion 6 for latching under the flange 2a. The upper end 5c of the leg 5b is positioned in the manipulation slit 7 formed in the plate member 3, so that a tool, such as a driver, can be inserted into the manipulation slit from above so as to deflect the leg 5b, thereby causing disengagement of the protrusion 6 from the flange 2a. In the drawings, reference numeral 8 designates a protuberance which, during attachment of the closure plate 1 to the opening 4, engages in an engagement hole 9 formed in the flange 2a. Reference numerals 13 and 14 each designate a reinforcing rib also functioning as a guide for proper positioning of the closure plate 1 relative to the opening.

In a state in which the closure plate 1 is attached in the opening 4 of the floor panel 2, the leg 5b of the locking pawl 5 is in its resiliently deflected position and pressingly engages with the flange 2a. At the same time, the protrusion 6 latches under the flange 2a, while the protuberance 8 is inserted into the hole 9. Accordingly and in this attached position, the closure plate 1 is limited from moving horizontally or vertically and thus any looseness between the closure plate and the flange 2a of the opening is prevented.

Attachment and detachment of the closure plate 1 relative to the opening 4 of the floor panel 2 will be explained below. The closure plate 1 is pressed into the opening 4 in the downward direction. By doing this, the protrusion 6 of the pawl 5 passes the flange 2a of the floor panel 2 and thus the closure plate 1 is easily and firmly secured to the opening 4. The thus secured closure plate 1 can be easily removed from the opening 4 by inserting the tip of a tool, such as a driver, into the manipulation slit 7 and then deflecting the leg 5b in the direction shown by arrow a in FIG. 4 so as to disengage the protrusion 6 of the locking pawl 5 from the flange 2a.

Figure 5:
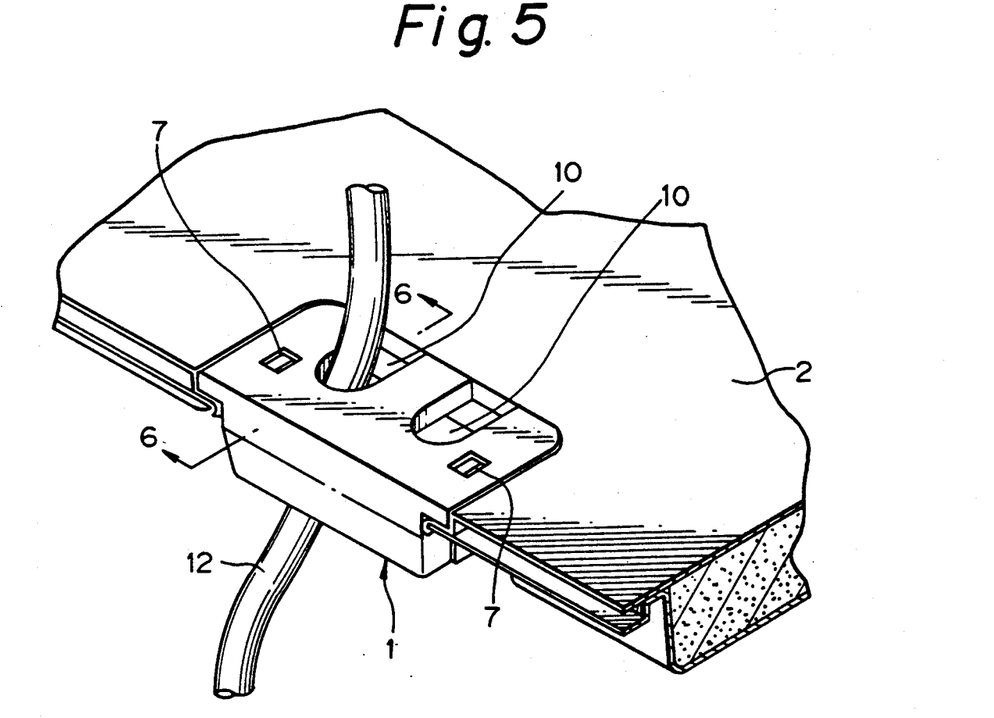
FIG. 5 is a perspective view illustrating the closure plate of FIG. 1 attached to the floor panel, with a cable passing through the wiring port of the closure plate.

As shown in FIGS. 1 and 2, the closure plate 1 includes guide portions 10a and 10b in its upper and lower surface respectively so as to define wiring ports 10 of U-shaped configuration (refer to FIG. 5). As illustrated in the drawings, the guide portion 10a in the upper surface of the closure plate has a dimension larger than that of the guide portion 10b in the lower surface of the closure plate so that the former extends in a course circumferentially outward of the latter. The wiring port of U-shaped configuration 10 is formed by clamping the portion 11 outlined by the guide portion using pliers, for example, and moving it upwardly so as to remove the portion 11 from the closure plate. By doing this, the thus removed portion 11 and the wiring port both are formed with a step like portion. It is therefore possible to again attach the portion which has been removed from the closure plate 1 in the wiring port 10. In this connection, it will be appreciated that, when the closure plate 1 with no wiring ports 10 is attached to the opening 4, the portion 11 outlined by the guide portion tends to remain in its position bearing against a vertical load which may be applied thereto by people walking around or equipment installed thereon, since, as explained in the above, the guide portion 10a in the upper surface extends circumferentially outward of the guide portion 10b in the lower surface of the closure plate 1.

It is to be understood that a conventional floor panel construction can be formed by attaching a closure plate 1 with no wiring ports to the opening 4 of the floor panels 2. On the other hand, a floor panel construction for the purpose of installation can be formed by attaching a closure plate 1 with wiring port 10, depending upon the wiring design in the opening of the floor panel. The floor panel of the invention is also applicable to cases in which harnesses of a larger size and/or flat cable are installed by simply removing the closure plate 1 from the opening of the floor panel.

Figure 6:
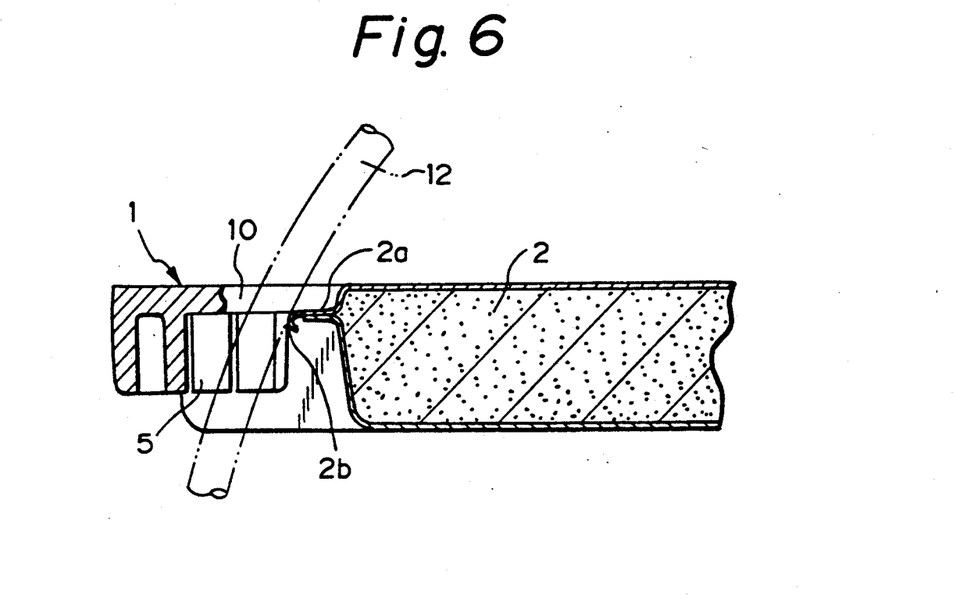
FIG. 6 is a cross-sectional view along line 6—6 in FIG. 5.

FIG. 5 is a perspective view of the embodiment of the invention in which the closure plate 1 having wiring ports 10 formed by removing the portion 11 outlined by the guide portion a is attached in the opening of the floor plate with cable 12 inserted in the wiring port 10. FIG. 6 is a sectional view along line 6—6 in FIG. 5. As shown in the drawings, the wiring ports are of U-shaped configuration with a part of its periphery opened. This facilitates insertion of a cable 12 into the wiring port 10 since the closure plate can be attached to the opening 4 with the wiring port thereof aligned with the cable which has already been passed through the opening 4.

It should also be noted that the periphery 2b of the flange 2a of the floor panel 2 is folded into a curved configuration, as shown in FIG. 6, so as to protect the cable from incurring any damages.

Figure 7:
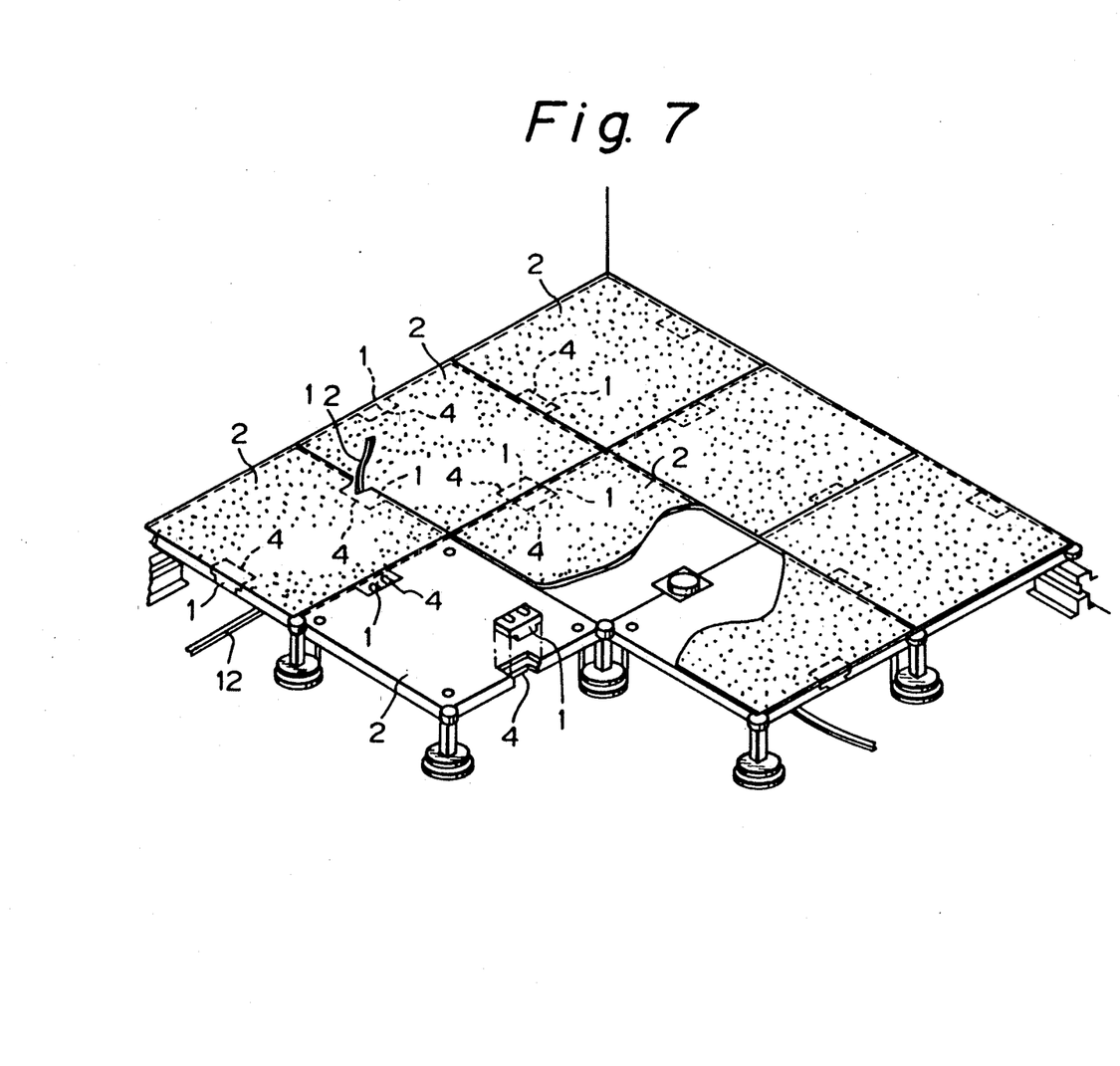
FIG. 7 is a perspective plan view illustrating one arrangement of the floor panels.

As shown in FIG. 7, it is possible to arrange a plurality of floor panels 2 such that the side of each of the floor panels with no opening 4 is positioned adjacent to the side each of the floor panels formed with an opening 4, and all of the four sides of the floor panels have an opening therein or adjacent thereto, whereby cables 12 can be drawn out from any desired point. Further, the floor panels according to the invention can be used as conventional floor panels by attaching the closure plate 1 having no wiring port 10 in each of the openings 4 which are; not intended to be provide with a cable, thereby closing such openings 4 so as to permit installation of equipments thereon and/or walking of personel thereon. On the other hand, a floor panel for permitting wiring of cables can be constituted by attaching the closure plate 1 formed with wiring port 10 in the openings 10. In this connection, any desired number of the wiring ports can be obtained depending upon the number of cables to be used. Furthermore, a floor panel for installation of harnesses of a larger size and/or flat cables can be provided by removing the closure plate 1 from the opening 4. Thus, there is provided in accordance with the invention a floor panel which facilitates increase of equipment mounted thereon and/or modification of the layout of the equipment.

Figure 8:
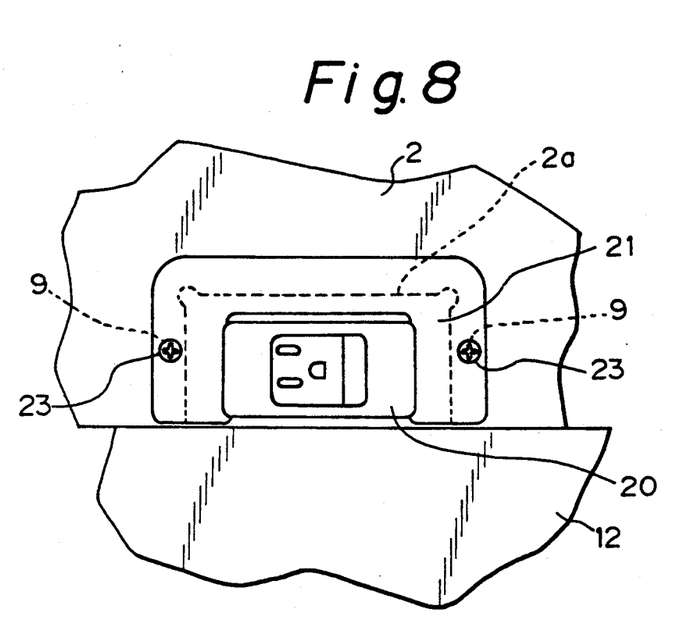
FIG. 8 is a plan view illustrating a wiring device secured in the opening of the floor panel.
Figure 9:
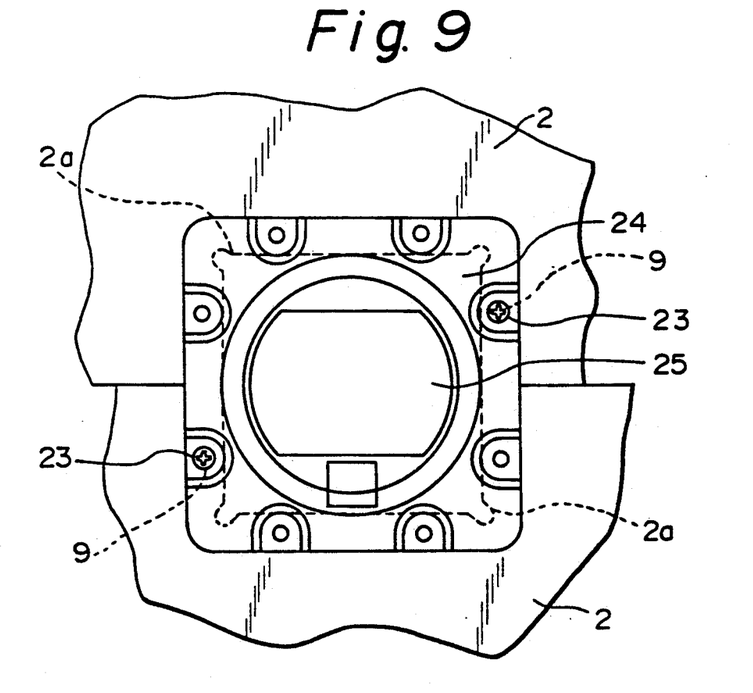
FIG. 9 is a plan view illustrating a closure plate of a larger size inserted into and secured in an opening of a larger size formed by matching up the openings of two adjacent floor panels.

When it is intended to mount a wiring device 20, such as convenience outlet or receptacle in the floor panel, an attachment plate 21, in place of the closure plate 4, is secured to the flange 2a of the opening 4 by means of screws 23 and then the wiring device 20 is inserted into a bore in the attachment plate 21 for fixing thereto, as shown in FIG. 8. The engagement hole 9 formed in the flange 2a of the opening 4 can be utilized as a screw hole, thus obviating the requirement of any additional for specific treatment to the floor panel 2. In this connection, it is possible to obtain an opening for receiving therein and securing thereto an attachment plate 24 of a large size by so arranging the adjacent two floor panels that the openings 4 of the adjacent two floor panels are coincident with each other. Thus, a wiring device 25 of a larger size can be inserted into a bore of the attachment plate 24 for securement thereof to the attachment plate.

Figure 10:
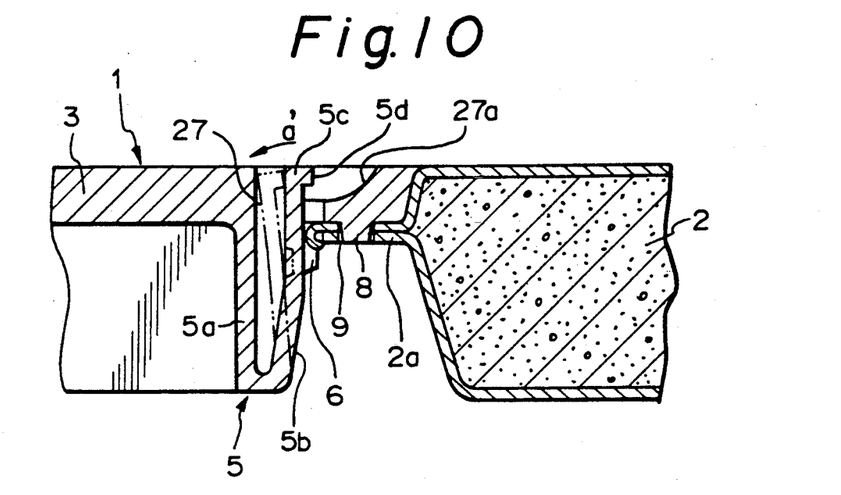
FIG. 10 is a cross-sectional view of a closure plate in accordance with another embodiment of the invention, showing the closure plate attached in the opening of the floor panel.
Figure 11:
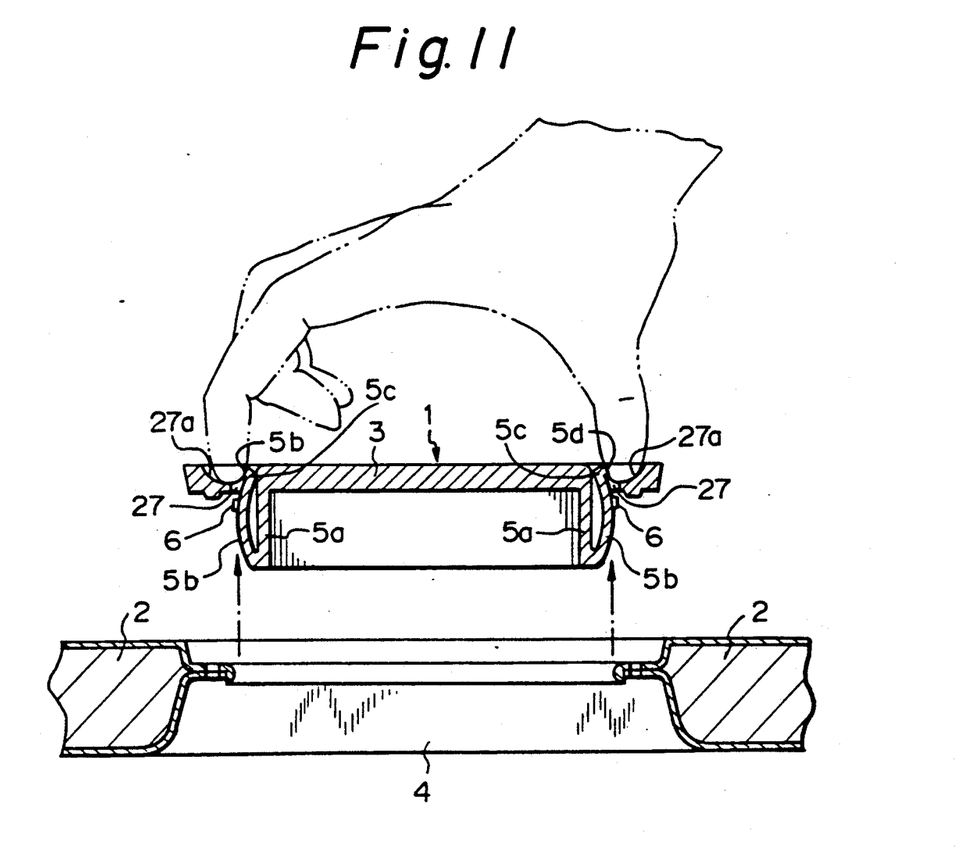
FIG. 11 is a cross-sectional view of the closure plate of FIG. 10 showing a disengaged position thereof from the floor panel.

Another embodiment of the invention will be described hereinafter with reference to FIGS. 10 and 11.

The closure plate 1 of this embodiment comprises a plate member 3 constituting in its installed position a part of the surface of the floor panel 2 and a flexible locking pawl 5 adapted to engage with a flange portion 2a extending around the inner periphery of the opening 4 of the floor panel 2. The pawl 5 is in the form of a U-shaped configuration with the upper end thereof open. That is to say, one leg 5a of the pawl 5 extends integrally from the plate member 3 in the downward direction and is bent into a U-shaped configuration at its lower end, while the other leg 5b extends upwardly from the bent lower end to terminate at its upper free end 5c. The free end 5c is provided with an enlarged portion 5d. The leg 5b is provided at the intermediate point along its length with a protrusion 6 for latching under the flange 2a. The upper free end 5c having the enlarged portion 5d is positioned in the manipulation bore 27 formed in the plate member 3, so that fingers of a user can be inserted into a recessed portion 27a of a semi-circular configuration formed in the periphery of the manipulation bore 27 so as to deflect the free end 5c, whereby disengaging of the protrusion 6 from the flange 2a.

Attachment and detachment of the closure plate 1 relative to the opening 4 of the floor panel 2 will be explained below. The closure plate 1 is pressed into the opening 4 in the downward direction. By doing this, the protrusion 6 of the pawl 5 passes the flange 2a of the floor panel 2 and thus the closure plate 1 is easily and firmly secured to the opening 4. The thus secured closure plate 1 can be easily removed from the opening 4 by inserting fingers into the recessed portion 27a of the bore 27 and depressing the free end 5c so as to deflect the leg 5b in the direction shown by arrow a' in FIG. 10. Thus, the protrusion 6 of the locking pawl 5 is disengaged from the flange 2a, whereby the closure plate 1 can be displaced upwardly with the enlarged portions 5d grasped by fingers.

As described above, the locking pawl is resiliently deformed upon attachment into the opening of a floor panel and thus cause reactive force which acts on a flange of the opening of the floor panel so as to retain the closure plate therein in a press-fit manner. Accordingly, any looseness between the opening and the closure plate can be obviated. Further, the enlarged portion formed on the pawl latches under the flange of the opening, whereby dislodgement of the closure plate from the opening is protected.

Further, a wiring port can be easily formed by removing the portion of the closure plate surrounded by the guide portion. An opening which is intended to have a cable inserted therethrough will be covered with a closure plate; with its wiring port open. Alternatively, an opening which is not intended to have a cable inserted therethrough will be covered with a closure plate with its wiring port closed.

Furthermore, a finger is accessible to the enlarged portion on the free end of the pawl positioned in the manipulation bore so as to release the press-fit engagement force of the pawl against the flange portion of the opening, whereby the closure plate can be easily removed from the opening thus allowing easy wiring work even after the completion of installation.

What is claimed is:

1. A closure plate for detachable engagement in an opening in a floor panel, said closure plate comprising:
   a plate member having at least one manipulation slit therein; and
   at least one flexible resilient locking pawl having a generally U-shaped configuration with one end of one leg thereof supported on said plate member and the other leg having the free end thereof positioned in said manipulation slit, said other leg having an outwardly extending protrusion thereon resiliently engagable under the edge of the floor panel around the opening therein when said closure plate is in said opening for holding said plate member against removal from the opening, said other leg being movable toward said one leg by manipulation of the free end of said other leg toward said one leg in said manipulation slit to free said protrusion from the edge of said floor panel to thereby release said closure plate for removal from the opening in the floor panel.

2. A closure plate as claimed in claim 1 in which there is a pair of said manipulation slits and a pair of said locking pawls on opposite sides of said plate member.

3. A closure plate as claimed in claim 1 in which at least one of the upper and lower surfaces of said plate member has a guide portion therein defining a wiring port.

4. A closure plate for detachable engagement in an opening in a floor panel, said closure plate comprising:
   a plate member having at least one manipulation slit therein and a recessed portion adjacent and opening into said manipulation slit; and
   at least one flexible resilient locking pawl integral with and supported on said plate member and having a free end thereof positioned in said manipulation slit, said locking pawl having an outwardly extending protrusion thereon resiliently engagable under the edge of the floor panel around the opening therein when said closure plate is in said opening for holding said plate member against removal from the opening, said free end of said locking pawl being movable by insertion of a finger into said recess and toward in said manipulation slit to free said protrusion from the edge of said floor panel to thereby release said closure plate for removal from the opening in the floor panel.

5. A closure plate as claimed in claim 4 in which there are a pair of said manipulation slits and recesses and a pair of locking pawls on opposite sides of said plate member, and said free ends of said locking pawls having an enlarged portion thereon which can be gripped by fingers for lifting said closure plate out of the opening after said free ends of said locking pawls are manipulated to disengage said protrusions from the edge of the floor panel.

6. A closure plate as claimed in claim 4 in which at least one of the upper and lower surfaces of said plate member has a guide portion therein defining a wiring port.

* * * * *